United States Patent [19]
Krishna

[11] 3,832,489
[45] Aug. 27, 1974

[54] BIDIRECTIONAL BUS REPEATER

[75] Inventor: Rallapalli Krishna, Maynard, Mass.

[73] Assignee: Digital Equipment Corporation, Maynard, Mass.

[22] Filed: Feb. 26, 1973

[21] Appl. No.: 334,951

[52] U.S. Cl. .................... 178/71 R
[51] Int. Cl. .................... H04l 25/20
[58] Field of Search .................... 179/170 R, 170 NC; 178/70 R, 71 R

[56] References Cited

UNITED STATES PATENTS

| | | | |
|---|---|---|---|
| 3,612,781 | 10/1971 | Da Costa et al. | 179/170 NC |
| 3,673,326 | 6/1972 | Lee | 178/71 R |

*Primary Examiner*—Kathleen H. Claffy
*Assistant Examiner*—Mitchell Saffian
*Attorney, Agent, or Firm*—Cesari and McKenna

[57] ABSTRACT

A bus repeater circuit for interconnecting first and second corresponding transmission lines for first and second adjacent bidirectional electrical bus sections. The bus repeater circuit includes first and second current sensors associated with each transmission line to apply a bipolar signal to first and second amplifiers respectively. Output signals from a given sensor of a first polarity indicate that the associated transmission line is transmitting a signal. The associated amplifier couples that signal to the other bus wire. Signals of a second polarity indicate that the associated bus transmission line is not transmitting a signal to the repeater and the associated amplifier provides a corresponding signal, thereby avoiding a latched condition.

6 Claims, 1 Drawing Figure

PATENTED AUG 27 1974
3,832,489
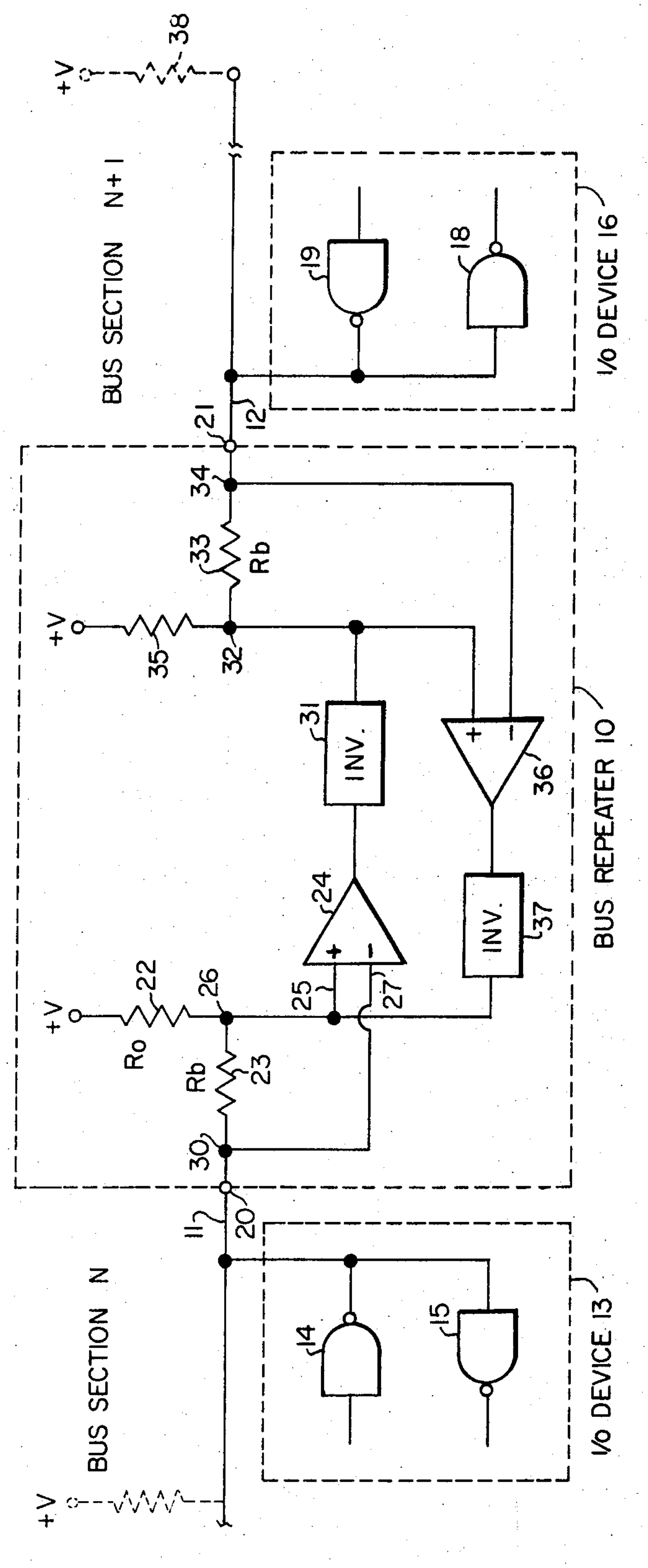

BIDIRECTIONAL BUS REPEATER

BACKGROUND OF THE INVENTION

This invention relates to data communications, and more specifically to the interconnection of adjacent electrical bus sections in a digital computer system.

Component assemblies in a digital computer system may be interconnected over a bidirectional electrical bus comprising a plurality of transmission lines. Tele-type-writers, cathode-ray display units and memory units are examples of such component assemblies. These assemblies have relatively high input impedances. However, complex digital computer systems may include many such component assemblies. In fact, the number of such assemblies may be such that their parallel-connected inputs produce a low net load impedance which materially alters signals on a single bus interconnecting all the assemblies.

Buses may also be physically long and long buses can attenuate signals. A reduced signal level results in an increased sensitivity to the effect of noise; this can decrease the reliability of data signals which are transmitted over the bus.

Generally, this problem is overcome by dividing the bus into sections and then interconnecting corresponding transmission lines in adjacent bus sections with bus repeaters, i.e., amplifiers that also shape the signals. If a relatively small number of component assemblies are connected to each bus section, loading effects in the individual sections are minimized. The bus repeaters reduce the overall attenuation by increasing the signal level at the end of each section, before excessive attenuation can occur.

Basically, a bus repeater receives a signal from one transmission line in a bus section, amplifies and shapes that signal and drives a corresponding transmission line in an adjacent bus section. While the approach is relatively straightforward when applied to unidirectionally conducting buses, which always transmit data in one direction, the solution is more complex when a bus repeater connects adjacent bidirectionally conducting bus sections. If the bus repeater merely comprises inversely parallel, or bilateral amplifying networks, a latching condition can result because the network generates positive feedback. Hence, a voltage on one bus forces both amplifiers into the same state. Thus, with each amplifier maintaining the other in that state, when the driving voltage ceases, the voltage of the driven, or output, wire does not. This is a latched condition.

To avoid this latched condition, prior repeaters use a control circuit in each bilateral amplifier circuit. When the transmission line from one bus section becomes the source of the driving signal, the control circuit blocks the passage of any signals from the corresponding wire in the adjacent bus section until the first transmitted signal ceases. If driving signals from both bus sections appear simultaneously, the control blocks both signals.

Basically, these control circuits are voltage sensing circuits and are somewhat complex because certain logical decisions regarding signal timing must be made. While the added complexity does not appear undue for a single transmission line, it must be remembered that a bus normally comprises a large number of transmission lines and there must be a bus repeater for each transmission line in the bus. This requires the control circuit to be duplicated a number of times for a high overall complexity and cost.

Therefore, it is an object of this invention to provide a simplified bus repeater circuit for bidirectionally conducting buses.

Another object of this invention is to provide a simplified and directional bus repeater which inherently prevents a latched condition.

Still another object of this invention is to provide a simplified bidirectional bus repeater which eliminates complex control circuits.

SUMMARY

In accordance with my invention, the bus repeater circuit senses currents in the bus transmission lines as opposed to voltages. The bus repeater circuit uses a sensor which generates a bipolar DC signal. The sensor is connected so the direction of current flow in each transmission line indicates whether that transmission line is receiving or transmitting a signal. A current sensor for a given wire connects to a differential amplifier which drives the other transmission line. When a transmission line carries a signal toward the repeater, the associated current signal sensor turns its amplifier on. The corresponding transmission line in the other bus section carries the signal away from the repeater. Its current sensor therefore generates a signal of the opposite polarity to keep its associated amplifier turned off, and thereby avoids the latched condition.

Since each repeater comprises only a pair of current sensors and a pair of amplifiers, it is simply constructed. Yet, it provides the same latch-avoidance function as the prior, more complex arrangements.

This invention is pointed out with particularity in the appended claims. A more thorough understanding of the above and further objects of this invention may be attained by referring to the following description taken in conjunction with the accompanying drawing.

BRIEF DESCRIPTION OF THE DRAWING

The sole FIGURE is a schematic diagram of a bus repeater between corresponding wires in adjacent bidirectional bus sections connected to representative component assemblies.

DESCRIPTION OF AN ILLUSTRATIVE EMBODIMENT

The FIGURE shows a bus repeater 10 coupling corresponding single transmission lines represented as wires 11 and 12 of adjacent bus subsections N and N+1. In actual use, when the bus comprises a number of wires, there may be a bus repeater analogous to the bus repeater 10 associated with each such wire.

A representative I/O device 13, or component assembly, contains a driver 14 and receiver 15, each represented by an inverting amplifier connected to the bus wire 11. Another I/O device 16 comprises a driver 17 and a receiver 18 connected to the wire 12. Only the drivers and receivers are shown in this FIGURE as the circuits which actually generate and utilize the signals are not important to an understanding of this invention.

In the following discussion it is assumed that the wires 11 and 12 are normally maintained at a positive potential representing a non-assertive or logically FALSE value. When the I/O device 13 generates a TRUE signal, the driver 14 grounds the wire 11, which connects to a terminal 20 in the bus repeater 10. Another terminal 21 couples the TRUE signal onto the wire 12 for reception by the receiver 18 in the I/O device 16. Similarly, if the I/O device 16 transmits a logically TRUE signal, the driver 19 grounds the wire 12 and the bus repeater 10 causes the wire 11 to assume a logically TRUE condition which the receiver 15 in the I/O device 13 senses.

Other I/O devices may connect to the wires 11 and 12. Each such I/O device may have an analogous receiver, driver or both.

Within the bus repeater 10, the terminal 20 connects to a series circuit comprising a resistor 22 for terminating the transmission line 11 in its characteristic impedance and a resistor 23 which acts as a current sensor. The resistor 22 connects to a source of positive potential (+V) while resistor 23 connects to the terminal 20. A differential amplifier 24 has a non-inverting input 25 connected to a junction 26 between the resistors 22 and 23 while the inverting input 27 connects to a junction 30 which is electrically equivalent to the terminal 20.

If the I/O device 13 grounds the wire 11 when it is transmitting, current flows conventionally from the positive voltage source through the resistors 22 and 23 and the voltage drop across the resistor 23 forces the non-inverting input 25 to be positive with respect to the inverting input 27. This condition turns on the amplifier 24 and an inverter 31 grounds a junction 32.

A similar circuit arrangement connects to the terminal 21. Specifically, another sensing resistor 33 connects the junction 32 to the terminal 21. As the far end of the bus 12 is also terminated with a resistor 38 connected to a positive voltage source, as shown in phantom, grounding the junction 32 produces a current flow through the resistor 33. If the resistor 33 has a relatively small magnitude in comparison with the termination resistor 38, then the junction 21 is substantially grounded. The receiver 18 senses a TRUE signal. Under these conditions, however, a junction 34, which is electrically equivalent to the terminal 21, is slightly positive with respect to the junction 32. The junctions 32 and 34 are connected respectively to the non-inverting and inverting inputs of a differential amplifier 36. This potential merely causes the amplifier 36 to be driven harder in the logically FALSE direction. This condition of the amplifier 36 is the same as when there is an absence of a TRUE signal from the wire 12, so no change occurs at the input of the inverter 37. The inverter 37 therefore remains inactive.

When the I/O device 13 stops generating its signal, the current through the resistor 23 ceases and the amplifier 24 turns off, enabling the bus 12 to return to the positive or logically FALSE state. As the amplifier 36 has remained in its initial condition, the junction 26 can return to the positive state and no latching condition exists. Similarly, the I/O device 16 generates a logically TRUE signal by grounding the wire 12. The voltage drop across the resistor 33, induced by current in the bus section N+1, drives the junction 34 negative with respect to the junction 32. The differential amplifier 36 provides a TRUE indicating output and the inverter 37 responsively grounds the junction 26 and effectively grounds the terminal 20. This produces a logically TRUE state on the wire 11 which the I/O device 13 and other I/O devices on the wire 11 sense. The differential amplifier 24, however, continues its FALSE indicating output because the voltage produced across the resistor 23, when the bus section N is receiving a signal, drives the input 25 negative with respect with the input 27.

Therefore, in accordance with my invention, the bus repeater 10 operates between adjacent sections of a bidirectional bus. Series resistors in the lines adjacent to termination resistances constitute bipolar current sensors so the bus repeater inherently senses which bus section is transmitting and which bus section is receiving. Positive feedback loops do not exist, so latching conditions are avoided.

It will be apparent to those skilled in the art that various modifications may be made to the specifically disclosed bus repeater. For example, different current sensing arrangements can be used. It is merely necessary to be able to sense the polarity of the current in order to drive the amplifier means. Simpler or even more complex amplifier circuits may be substituted for those specifically described. Therefore, it is the object of the appended claims to cover all such variations and modifications as come within the true spirit and scope of this invention.

What I claim as new and desire to secure by Letters Patent of the United States is:

1. A bus repeater adapted for connection in series between a pair of corresponding transmission lines in adjacent sections of a bus, said repeater comprising:

A. a first terminal adapted for connection to one transmission line in one bus section and a second terminal adapted for connection to a corresponding transmission line in the adjacent bus section, B. first and second termination means connected to each of said first and second terminals, respectively, each of said termination means including current sensing means connected to the corresponding terminal and terminating the transmission line connected thereto in substantially its characteristic impedance, C. first and second amplifier means connected to said current sensing means in said first and second termination means, respectively, each amplifier means generating an amplified data signal in response to an incoming signal from said respective current sensing means, the other of said sensing means coupling the amplifier output signal to the other transmission line and applying to its corresponding amplifier a signal of the opposite polarity to that of an incoming signal on said other transmission line.

2. A bus repeater circuit as recited in claim 1 wherein each of said amplifier means comprises a differential amplifier and an inverter connected to invert the output of said differential amplifier, said differential amplifier having inverting and non-inverting inputs connected across asid current sensing means.

3. A bus repeater circuit as recited in claim 1 wherein each termination means includes a first and second resistors in series, said first resistor connected to a terminal and constituting a current sensor and said second resistor being connected to a source of positive potential, thereby establishing a quiescent voltage signal at the terminal, the resistance of said first resistor being significantly less than that of said second resistor and said second resistor having a resistance substantially equal to the characteristic impedance of the transmission line.

4. A bus repeater circuit as recited in claim 3 wherein each amplifier means includes a differential amplifier and inverter in cascade, said differential amplifier having inverting and noninverting inputs connected across a corresponding first resistor with the inverting input being connected to a corresponding terminal, the output of the inverter being connected to the junction of the first and second resistors which are connected in series with the other terminal.

5. A bus repeater circuit for connecting corresponding transmission lines in first and second adjacent bus sections, said bus repeater circuit comprising:

A. a first terminal for connection to a transmission line in the first bus section, B. a second terminal for connection to a corresponding transmission line in the second bus section, said bus repeater circuit being in series between corresponding transmission lines, C. a first termination circuit comprising, in series, a first termination resistor and a first current sensing resistor connected to said first terminal, D. a second termination circuit comprising, in series, a second termination resistor and a second current sensing resistor connected to said second terminal, E. first differential amplifying means with inputs connected across first current sensing resistor and an output coupled with the junction of the second termination in current sensing resistors, and F. second differential amplifying means with inputs connected across said second current sensing resistor and an output coupled to the junction of said first termination in current sensing resistors.

6. A bus repeater as recited in claim 5 wherein each of said differential amplifying inputs include inverting and non-inverting inputs, said inverting inputs of said first and second differential amplifying means being connected to the first and second terminals respectively.

* * * * *